Patented Nov. 1, 1927.

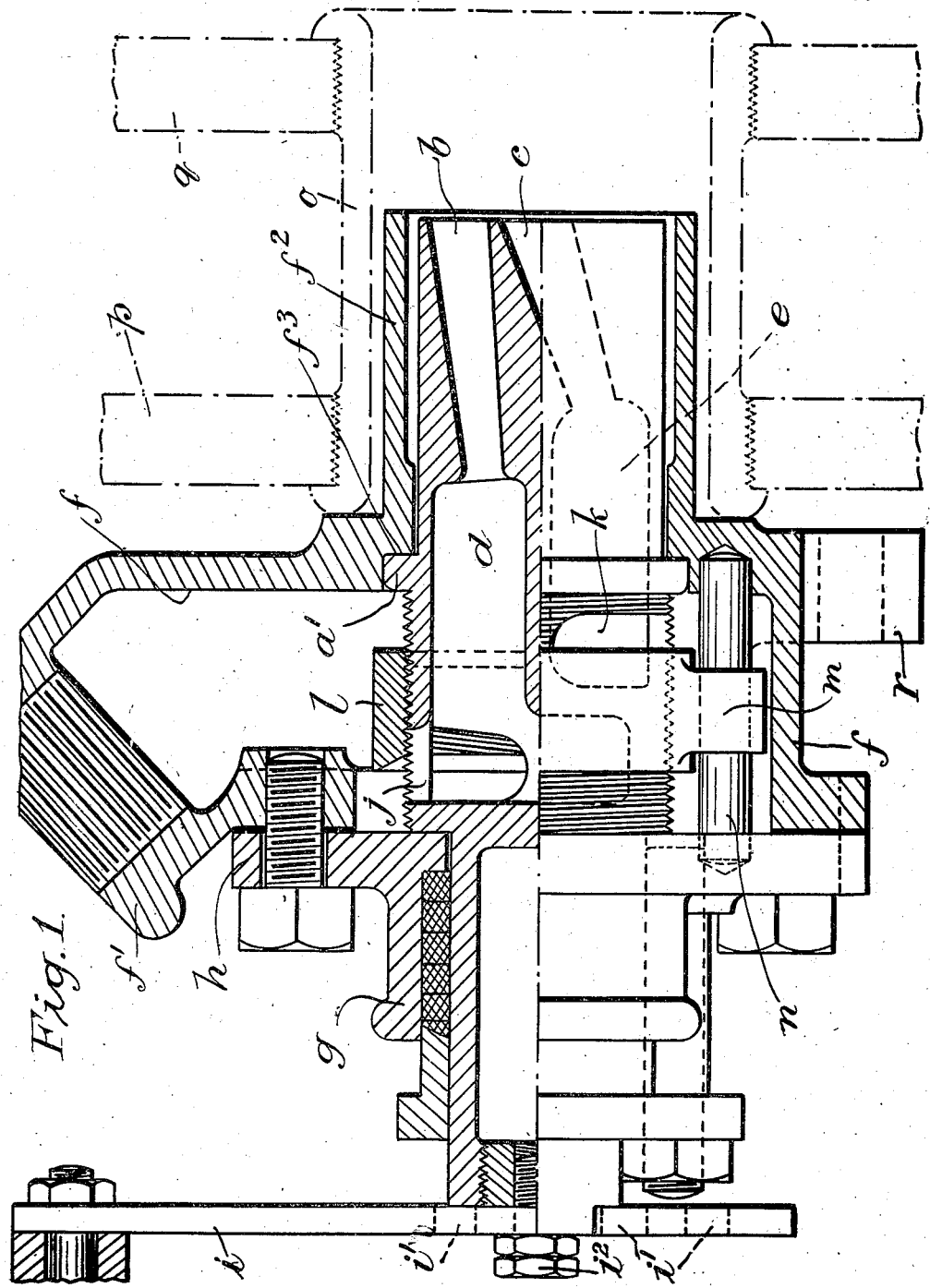

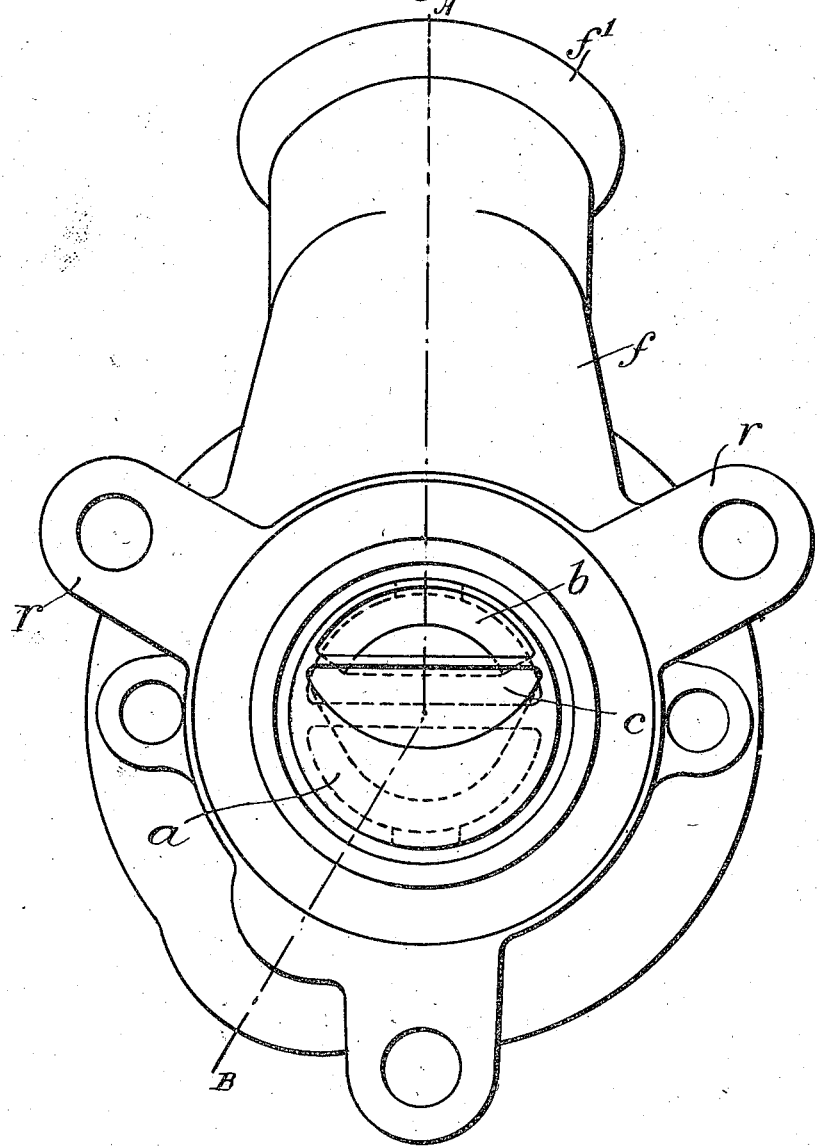

1,647,291

UNITED STATES PATENT OFFICE.

PERCY GILBERT HANDOLL, OF CATFORD, LONDON, ENGLAND.

APPARATUS FOR CLEANING BOILER TUBES AND THE LIKE.

Application filed October 2, 1926, Serial No. 139,197, and in Great Britain November 25, 1925.

This invention relates to blower apparatus for projecting jets of fluid under pressure on to boiler and like tubes for cleaning soot therefrom and has for its object to provide an improved construction of apparatus capable of operating over a large field, whilst having no moving parts susceptible to damage by exposure to the high temperatures of the furnace.

With this object in view the invention comprises a rotatable blower tube having two or more convergent nozzles, separate passageways conducting fluid under pressure to said nozzles and valve means operated by the rotation of the blower tube to vary the relative pressures of the jets and thereby the direction taken by the resultant jet of fluid.

The invention is hereinafter more particularly described with reference to the accompanying drawings in which a preferred form of construction is illustrated by way of example.

In these drawings:—

Figure 1 is a side elevation, partly in section, the planes of section being indicated by the line A—B in Figure 2, and Figure 2 is a front elevation of the same.

As will be seen the construction illustrated comprises a rotatable blower tube $a$ of cylindrical form having at its front end two convergent nozzles $b$ and $c$ communicating with separate cavities $d$ and $e$ in the central part of the blower tube. This blower tube is mounted for rotation in a body or steam box $f$ having a connection $f'$ for a pipe supplying steam or other fluid under pressure and formed with a projecting sleeve-like part $f^2$ by which the forward end of the blower tube is received and an annular seating $f^3$ engaged by an external flange $a'$ upon the blower tube $a$. The rear end of the blower tube $a$ extends through a stuffing box $g$ in a cover $h$ attached to the steam box $f$ and forms an operating shaft to the extremity of which a crank $i$ is attached to facilitate its manipulation. To enable the throw of the crank to be adjusted to suit requirements, it is formed with a series of spaced holes $i'$ for engagement with a fixing screw or stud $i^2$ taking into the end of the blower tube. As will readily be seen the crank may if preferred be replaced by a hand wheel, lever or other equivalent means of operation.

The separate cavities $d$ and $e$ communicate with the interior of the steam box by ports or openings $j$ and $k$ respectively, these being spaced in the direction of the axis of the blower tube and disposed on opposite sides thereof. To enable the relative pressures of the steam issuing from the nozzles $b$ and $c$ to be regulated simultaneously with the rotation of the blower tube a floating ring valve $l$ is arranged to surround and traverse the blower tube in the vicinity of the ports $j$ and $k$. This traversing is conveniently obtained by forming the interior of the valve ring and the exterior of the blower tube with co-acting screw-threads and by restraining the ring against rotation by engaging a forked lug $m$ at the periphery of the valve ring $l$ with a guide pin $n$ held in the steam box with its axis extending parallel with that of the blower tube.

The ring valve $l$ is so arranged that during the rotation of the blower tube $a$ it moves from one extreme position where it completely covers the port $j$ leaving the other port $k$ fully open to the other extreme position where it covers the port $k$ and fully exposes the port $j$. In intermediate positions of the valve both ports are opened to a degree depending upon the amount of traverse that has been imparted to the valve.

This improved apparatus is especially suited for use in connection with boilers of the locomotive type and for this purpose is mounted in the boiler front so that it may direct a jet of steam across the upper part of the fire box to the tubes at the rear thereof.

As indicated by dotted lines in the drawing the blower is mounted with its front end projecting into a housing tube $o$ extending between the outer shell $p$ of the boiler and the rear wall $q$ of the furnace and perforated lugs $r$ serve for fixing the device in position.

In operation the jets of steam issuing from the two convergent nozzles impinge one upon the other and produce a resultant jet whose directional angle is determined by the relative pressures at the respective nozzles. As these pressures are varied simultaneously with the rotation of the blower tube it will readily be understood that the resultant jet will trace a locus on the tube plate in the form of a spiral and in so doing act effectively on all tubes contained within the field covered.

I claim:—

1. A blower apparatus for cleaning boiler and like tubes comprising a rotary blower tube having convergent nozzles arranged to form a single jet when the nozzles are discharging simultaneously, the blower tube having ports establishing connection with the respective nozzles and a source of steam, and a valve movable to vary the port openings relative to each other.

2. A blower apparatus for cleaning boiler and like tubes comprising a rotary blower tube having two convergent nozzles arranged to form a single jet when the nozzles are discharging simultaneously, the blower tube having ports establishing connection with the respective nozzles and a source of steam, and a valve actuated automatically by the rotation of the blower tube, movable to reduce the area of one port opening and simultaneously increasing the area of the other port opening.

3. A blower apparatus for cleaning boiler and like tubes comprising a steam box, a blower tube with two convergent nozzles mounted for axial rotation in said steam box said nozzles arranged to form a single jet when discharging simultaneously, a valve mounted for longitudinal movement upon the exterior of the blower tube and coacting with the ports, said valve as it moves reducing the area of one port opening and simultaneously increasing the area of the other port opening, and means for shifting said valve automatically as the blower tube rotates.

4. A blower apparatus for cleaning boiler and like tubes comprising a steam box, a blower tube having two convergent nozzles mounted for axial rotation in this steam box said nozzles arranged to form a single jet when discharging simultaneously, the blower tube having separate ports for admitting the steam from the steam box to the respective nozzles, the ports being disposed in longitudinal offset relation to each other, the exterior of the blower tube being threaded and a ring valve mounted within said box and interiorly threaded to engage the first named thread, said ring valve moving across the ports and being held from rotary movement, whereby, as the blower tube is rotated, the ring valve will gradually close one of said ports and open the other port.

5. A blower mechanism for cleaning boilers and the like comprising a steam box, and an axially rotatable blower tube having two convergent nozzles, and mounted for rotation in said steam box, both of said nozzles being inclined in the same direction and arranged to form a single jet when discharging simultaneously, the nozzles having communication with the interior of the steam box and means acting as the blower tube is rotated to decrease the supply of steam to one nozzle and increase the supply of steam to the other nozzle.

6. A blower apparatus for cleaning boiler and like tubes comprising a steam box, a blower tube rotatable axially in said box, the blower tube having two separate convergent nozzles extending longitudinally of the blower tube and converging at the forward end thereof and said blower tube having two ports for respectively admitting steam from the interior of the box to said separate nozzles, one port being disposed in advance of the other port, the exterior of the blower tube being screw-threaded, a ring valve surrounding the blower tube and engaging the screw-threads, said ring valve upon a rotation of the blower tube being longitudinally shifted in one direction or the other and acting to simultaneously reduce the area of one of said ports while increasing the area of the other port, and means restraining said ring valve against rotation during the rotation of the blower tube.

7. A blower apparatus for cleaning boiler and like tubes comprising a chamber for containing fluid under pressure connected during the operation of the apparatus to a source of fluid, a blower tube rotatable axially in said chamber and having a plurality of separate convergent nozzles extending longitudinally of the blower tube and converging at the forward end thereof and arranged to form a single jet when the nozzles are discharging simultaneously, there being ports admitting fluid from the interior of the chamber to said separate nozzles, and means adjustable to vary the relative pressures of the jets of fluid issuing from said nozzle to thereby vary the direction of the single jet so produced.

8. Blower apparatus for cleaning boiler and like tubes comprising a steam box, a blower tube rotatable in said box, a plurality of separate convergent nozzles at the forward end of the blower tube, said nozzles being arranged to form a single jet when discharging simultaneously, the blower tube having separate ports communicating respectively with the convergent nozzles, a ring valve surrounding the blower tube and having screw-threaded engagement therewith, and guide means restraining rotation during the rotation of the blower tube but permitting the ring valve to move longitudinally with relation to said ports and the blower tube and across said ports.

9. Blower apparatus for cleaning boiler and like tubes comprising a steam box, a blower tube having convergent nozzles, the tube being mounted for axial rotation in said steam box, said nozzles being arranged to form a single jet when the nozzles are discharging simultaneously, the blower tube having separate ports affording communication between the steam box and the respective nozzles, a ring valve surrounding the blower tube for cooperation with said ports to control flow therethrough, and screw means for causing the valve to traverse the blower tube longitudinally as the latter is rotated, said valve acting as it travels to vary the extent to which the ports in the blower tube are opened.

10. A blower apparatus for cleaning boiler and like tubes comprising a steam box having a projecting sleeve, the steam box being formed with an inlet opening opposite to the sleeve, a blower tube extending longitudinally through the steam box and having convergent nozzles projecting into the sleeve, said nozzles being arranged to form a single jet when discharging simultaneously, a packing gland in the steam box through which the rear end of the blower tube extends, the blower tube being provided with longitudinally off-set ports, one for each nozzle, the ports communicating with the interior of the steam box, means on the rear end of the blower tube for axially rotating it, and means acting automatically as the blower tube is rotated to vary the respective port openings with relation to each other.

11. Blower apparatus for cleaning boiler and like tubes comprising a steam box, a blower tube with a plurality of convergent nozzles mounted for rotation in said steam box, said nozzles being arranged to form a single jet when discharging simultaneously, ports in the blower tube establishing connection between the steam box and the respective nozzles, and a valve actuated by the rotation of the blower tube for controlling said ports simultaneously.

In testimony whereof he has affixed his signature.

PERCY GILBERT HANDOLL.